INVENTOR.
Paul W. Lehman.
BY
ATTORNEY.

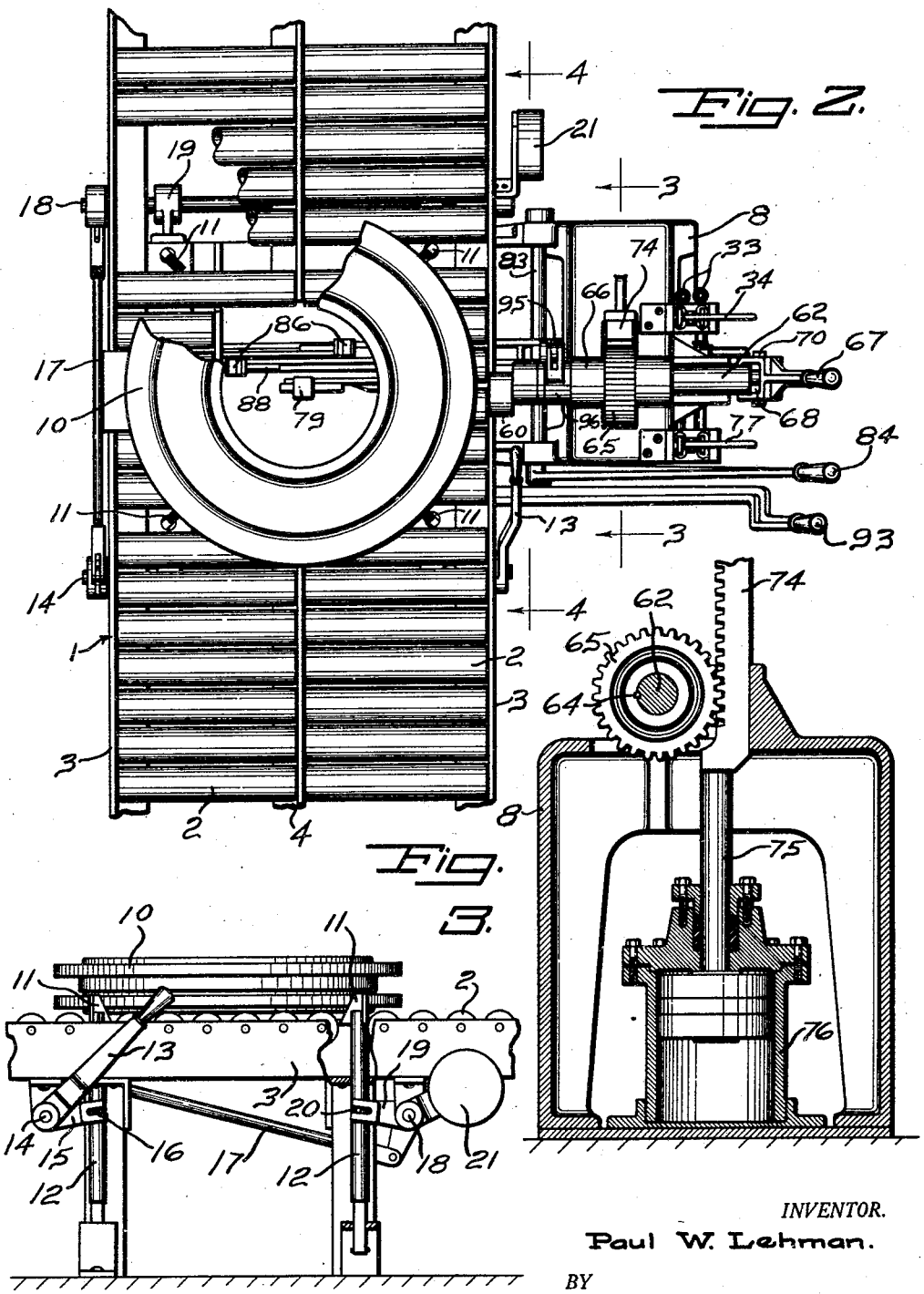

June 16, 1931.  P. W. LEHMAN  1,809,856
TIRE MOLD SERVICING MACHINE
Filed Aug. 6, 1929  4 Sheets-Sheet 4
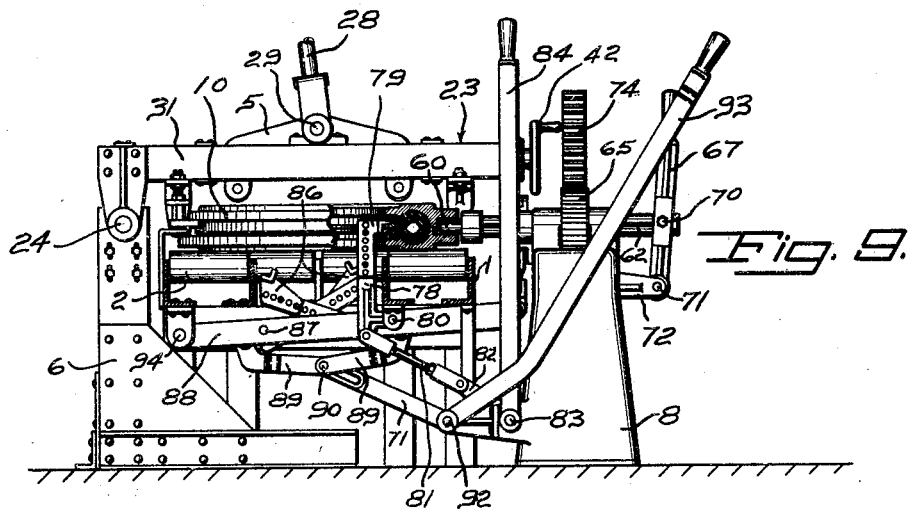
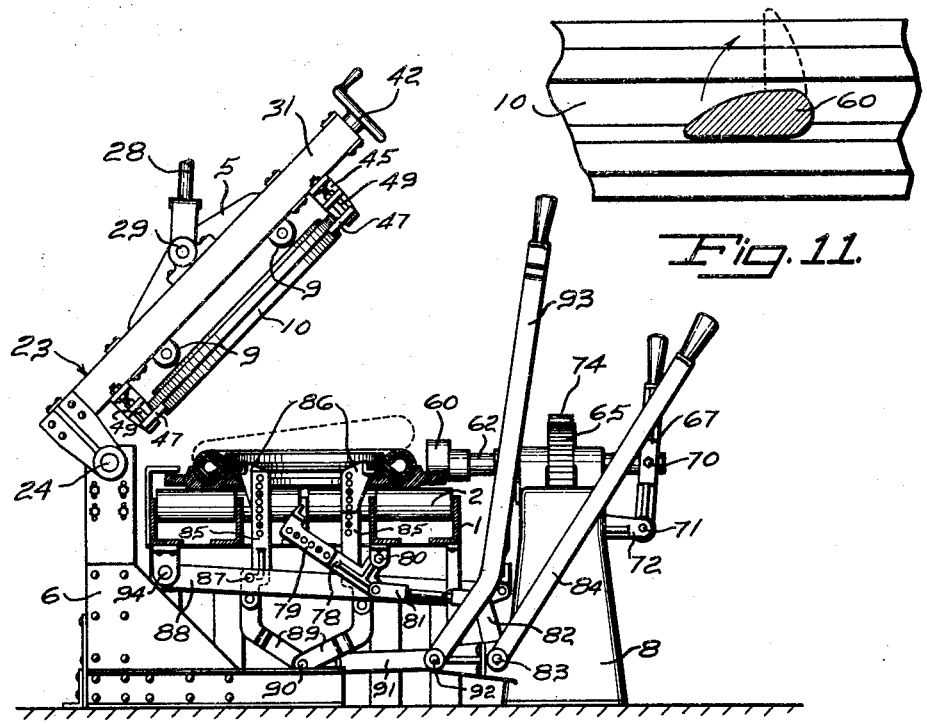
INVENTOR.
Paul W. Lehman.
BY
ATTORNEY.

Patented June 16, 1931

1,809,856

UNITED STATES PATENT OFFICE

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

TIRE MOLD SERVICING MACHINE

Application filed August 6, 1929. Serial No. 383,969.

My invention relates to the vulcanization of pneumatic tires and more particularly to a device for handling the molds in which the tires are vulcanized.

According to a customary method of vulcanizing tires the latter are placed in molds which are stacked in a cylindrical heater to be vulcanized. In the past it has been customary to service the molds as they were carried to and from the heaters on a conveyor which ran past a series of operators; for example, the molds were discharged from the heater onto the conveyor which carried them by operators spaced along the conveyor who successively broke open the molds, removed the top half, stripped the tire from the mold, lubricated the mold, or otherwise prepared it, inserted a raw tire in the empty mold and reassembled the top and lower mold halves, after which the molds were conveyed back to the heater. In this method the work of a large number of men was dependent upon the work of each individual of the group; thus, if the men breaking the mold experienced difficulty the conveyor had to be stopped and the rest of the operators were idle until the conveyor started again and so on down the line.

It is an object of my invention to provide a unitary device by means of which a single operator may perform all of the servicing operations on the mold at a single point and with greater rapidity and less labor than by prior means. Other and further objects will be apparent from the following specification and claims.

In the accompanying drawings which illustrate one embodiment of my invention,

Fig. 2 is a plan view of the structure shown in Fig. 1 with the upper mold half lifting mechanism omitted;

Fig. 3 is a section substantially on line 3—3 of Fig. 2;

Fig. 4 is a section substantially on line 4—4 of Fig. 2;

Fig. 9 is a view similar to that of Fig. 1 but with parts omitted and broken away and showing the elements in position for the mold breaking step;

Fig. 10 is a view similar to that of Fig. 9 but with the upper mold half raised; and Fig. 11 is a detail of the mold breaking wedge.

Figure 1:
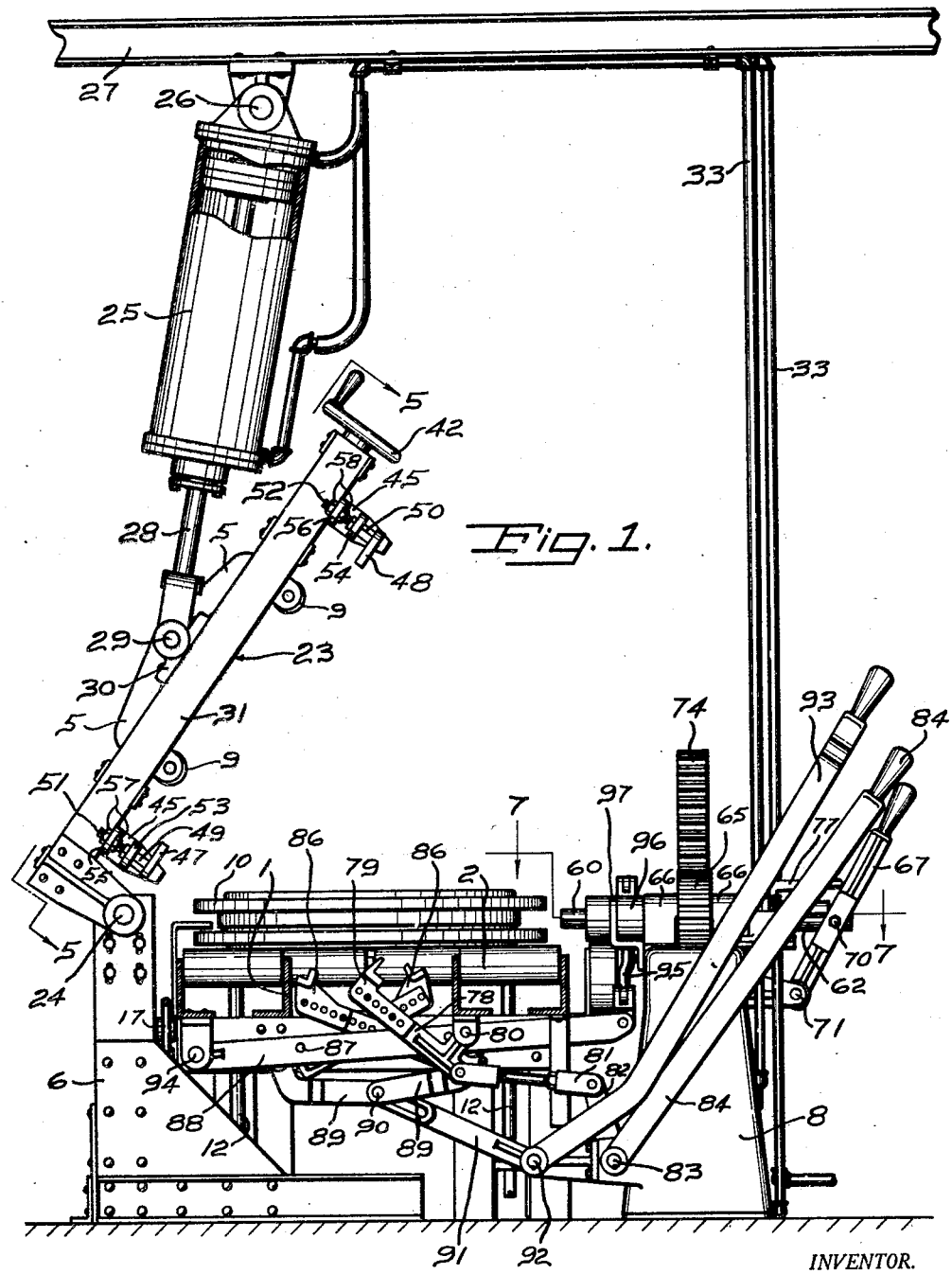
Fig. 1 is a side elevation of the machine.

Referring to the drawings, 1 designates generally a work conveyor which as shown is formed of anti-friction rolls 2 supported by side rails 3 and a center rail 4. This work conveyor serves as a support for the mold during the servicing operations and may form an element of the conveyor for transporting the molds to and from the heaters.

The operating elements of the machine are supported by standards 6 and 8 positioned on opposite sides of conveyor 1 as best shown in Fig. 1. In order that the molds, one of which is shown in the drawings and designated generally by the reference character 10, may be centered on the conveyor 1 with respect to the operating elements I have provided a plurality of centering wedges 11 (see Figs. 2 and 4), carried by vertical rods 12 which are guided for vertical movement in the frame of conveyor 1. The rods 12 are adapted to be simultaneously moved upwardly between the rolls of the conveyor by means of a lever 13 secured to a rock shaft 14 provided with slotted arms 15 operatively engaging pins 16 on the adjacent pair of rods 12. Shaft 14 is connected by a linkage 17 to a similar rock shaft 18 provided with arms 19 operatively engaging pins 20 on the other pair of rods 12. Shaft 18 is provided with a weight 21 which tends to hold the rods 12 in either their operative or inoperative position.

Figure 5:
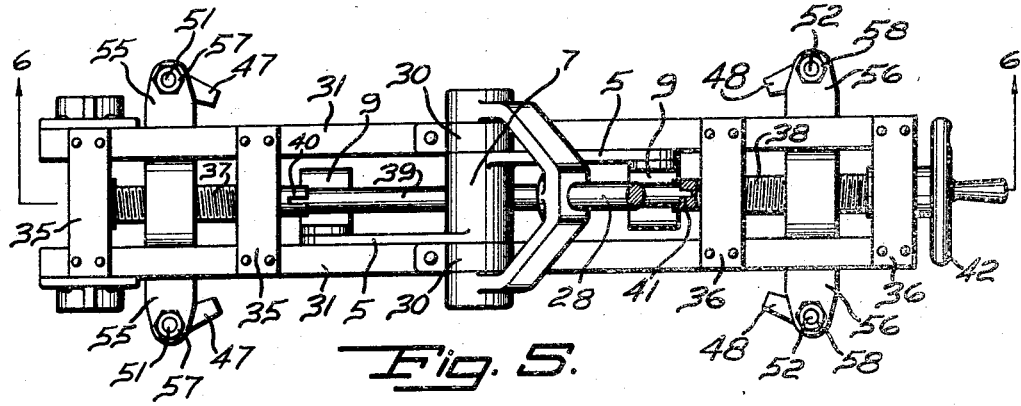
Fig. 5 is a section substantially on line 5—5 of Fig. 1.
Figure 6:
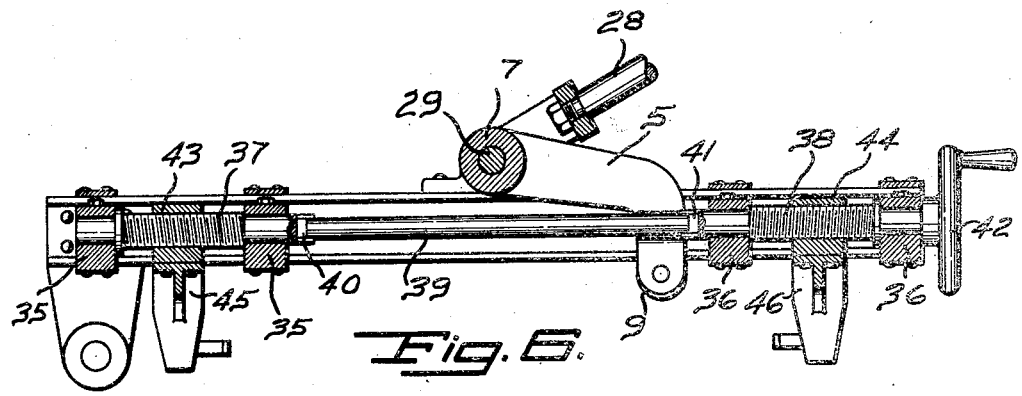
Fig. 6 is a section on line 6—6 of Fig. 5.

The means for raising the upper mold half as the mold is "broken" (by means later described) comprises a bridge member 23 adjustably pivoted at one end, as at 24, to the standard 6 (see Fig. 1). The bridge is adapted to be raised and lowered by means of an air cylinder 25, which is pivoted at 26 to a beam 27 positioned over the bridge, the piston rod 28 of the cylinder being pivoted to a short shaft 29 journaled in bearings 30 secured to side frames 31 of the bridge. The air cylinder is supplied with compressed air in a conventional manner through air lines 33 and controlled by suitable valves as at 34. Referring to Figs. 5 and 6, the side frames 31 of the bridge are connected by pairs of transverse blocks 35 and 36 which form bearings respectively for oppositely threaded screws 37 and 38 which are connected together by a rod 39 keyed as at 40 and 41 to the inner ends of the screws. The outer end of screw 38 is extended beyond the outer bearing 36 to receive a hand wheel 42 positioned at the free end of the bridge. Threaded on screws 37 and 38 respectively are travelers 43 and 44 which engage the side frames 31 as guides and carry on their under sides inverted V-shaped brackets 45 and 46. These brackets respectively carry pairs of inwardly projecting fingers 47 and 48, formed with squared shanks 49 and 50, (see Fig. 1) and threaded ends 51 and 52. The squared shanks slide in ears 53 and 54 formed on brackets 45 and 46 and the threaded ends pass through ears 55 and 56 similarly supported, the fingers being adjustably locked in position by nuts 57 and 58. To aid in closing the molds, as later described, I provide arms 5 secured to a hub 7 freely pivoted on shaft 29. The free ends of arms 5 are preferably provided with rollers 9.

Figure 7:
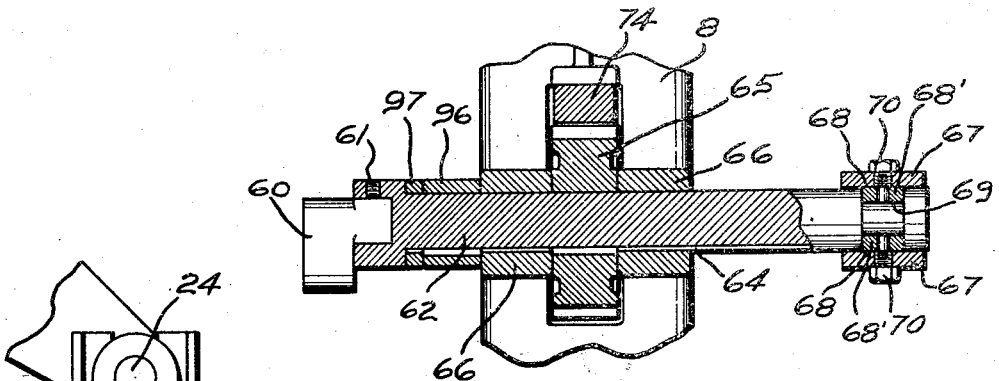
Fig. 7 is a section on line 7—7 of Fig. 1.
Figure 8:
Fig. 8 is a detail view of the adjusting means for the pivot of the lifting device for the upper mold half.

The means for "breaking" the mold, that is, separating the upper mold half from the lower half and from the tire, comprises a wedge cam 60 shown in section in Fig. 11. As shown in Figs. 1 and 2, when the mold is drawn onto the conveyor 1 this wedge cam is retracted out of the way of the mold but is adapted to be moved into operative position between the flanges of the mold halves as shown in Figs. 9 and 11. The wedge cam, as best shown in Fig. 7, is secured as by a set screw 61 to a shaft 62, splined as at 64 to slide in a gear 65 and journaled in bearings 66 formed on standard 8. Shaft 62 is adapted to be moved from the inoperative position shown in Fig. 1 to the operative position of Fig. 9 by means of a hand lever 67 provided intermediate its length with an opening 68 which embraces the end of shaft 62 and is operatively connected to the shaft by means of loose block 68', engaging in a groove 69 formed in the end of the shaft, and carried on studs 70 threaded in the sides of lever 67. The lower end of lever 67 is pivoted at 71 to a bracket 72 secured to standard 8. The shaft 62 is rotated through an angle of substantially 90°, to move the wedge cam 60 from the full line position of Fig. 11 to the dotted line position, by means of a rack 74 which meshes with gear 65. As shown in Fig. 3 the rack 74 is formed on the end of a piston rod 75 operating in compressed air cylinder 76. The admission of air to cylinder 76 is controlled by a conventional valve 77.

In order to assure that the tire is retained in the lower half of the mold during the breaking operation I provide a clamping arm 78 which is shown in operative position in Fig. 9 and in inoperative position in Figs. 1 and 10. This arm is provided with an adjustable head 79 and is pivoted to the frame of the conveyor 1 at 80, the lower end being connected by a link 81 to an arm 82 secured to a rock shaft 83 to which is keyed an operating hand lever 84.

After the mold is broken and the top half removed it is necessary to strip the tire from the lower half of the mold. For this purpose I provide a pair of arms 85 provided with adjustable stripper heads 86. These arms (see Figs. 1, 9 and 10) are pivoted as at 87 to a bar 88 and their lower ends are connected by links 89, having a common pivotal connection 90 to an arm 91 secured to a rock shaft 92 which is adapted to be rocked by a hand lever 93. Bar 88 is pivoted at one end as at 94 to the conveyor frame and the other end is connected by a link 95 (see Figs. 1 and 2) to a hub 96 splined for rotation to shaft 62 and held between the adjacent bearing 66 and a bracket 97 secured to standard 8. The link 95 and hub 96 are so positioned with respect to shaft 62 that when the wedge cam is in the position shown in Fig. 10, that is, immediately after the mold has been broken, the bar 88 is in lowered position. With the parts so positioned, hand lever 93 is moved from the inoperative position of Figs. 1 and 9 to the position of Fig. 10, thus bringing stripping heads 86 into position beneath the bead rings of the tire. Air is now admitted into cylinder 76 to raise rack 74, thus rotating shaft 62 and wedge cam 60 to the initial position of Figs. 1 and 9, and raising bar 88 by link 95 to move the stripper heads upwardly, stripping the tire from the lower mold half as shown in dotted line in Fig. 10.

The complete operation of the device will now be described. With the parts in the position shown in Fig. 1, a mold 10 carrying a cured tire is drawn onto conveyor 1 and centered by means of wedges 11 operated by lever 13 (Fig. 4). The bridge 23 is then lowered and by means of hand wheel 42 the fingers 48 are moved beneath the flange of the upper half of the mold as shown at the left in Fig. 9. Clamping head 79 is then brought into position to engage the upper side of the bead ring upon which the tire is mounted. Air may now be admitted to cylinder 25 to raise bridge 23 but the power is insufficient to break the mold so that the bridge is held down by the mold against the air in the cylinder. By means of lever 67 the wedge cam is now moved from its retracted position as shown in Fig. 1 to a position between the flanges of the mold as shown in Fig. 7. Air is now admitted to the top of cylinder 76 to draw down rack 74 and rotate shaft 62 and move wedge cam 60 to the position shown in Fig. 10. The wedging force of the wedge cam separates the mold halves permitting the cylinder 25 to raise the bridge 23, and with it the upper half of the mold, as shown in Fig. 10. The clamping head 79 is now retracted and stripping heads 86 are raised by lever 93 to a position beneath the tire bead ring as shown in Fig. 10. A reversal of the air in cylinder 76 now raises rack 74 rotating shaft 62 to initial position and at the same time raising bar 88, to which the stripping heads are attached, to strip the tire from the mold. The tire may now be removed, strippers 86 returned to inoperative position and wedge cam 60 retracted. The mold may now be lubricated or otherwise prepared, a raw tire inserted and the bridge lowered to return the mold cover to place, the thrust of cylinder 25 being sufficient to force the mold tightly closed, the pressure on the mold being equalized by the freely pivoted arms 5.

It will be understood that the various adjustments described permit the machine to accommodate molds of various sizes.

Having thus described my invention, I claim:

1. A tire mold servicing machine which comprises a support adapted to receive a closed mold, a bridge member pivoted at one side of the support, means to raise and lower the bridge member about its pivot and means carried by the bridge member to releasably engage the upper half of the mold.

2. A tire mold servicing machine which comprises a support adapted to receive a closed mold, means carried by the support to engage the lower half of the mold and releasably hold the mold in predetermined position, a bridge member pivoted at one side of the support, means to raise and lower the bridge member about its pivot and means carried by the bridge member to releasably engage the upper half of the mold.

3. A tire mold servicing machine which comprises a support adapted to receive a closed mold, means carried by the support to engage the lower half of the mold and releasably hold the mold in predetermined position, a bridge member pivoted at one side of the support, means to raise and lower the bridge member about its pivot, means carried by the bridge member to releasably engage the upper half of the mold, and cam means positioned at one side of the support, and movable between the flanges of the upper and lower mold halves, to initially separate the mold halves.

4. A tire mold servicing machine which comprises a support adapted to receive a closed mold, means carried by the support to engage the lower half of the mold and releasably hold the mold in predetermined position, a bridge member pivoted at one side of the support, means to raise and lower the bridge member about its pivot, means carried by the bridge member to releasably engage the upper half of the mold, cam means positioned at one side of the support, and movable between the flanges of the upper and lower mold halves, to initially separate the mold halves and holding means adapted to engage the bead ring of the tire to hold the tire in the lower half of the mold when the mold halves are separated.

5. A tire mold servicing machine which comprises a support adapted to receive a closed mold, means carried by the support to engage the lower half of the mold and releasably hold the mold in predetermined position, a bridge member pivoted at one side of the support, means to raise and lower the bridge member about its pivot, means carried by the bridge member to releasably engage the upper half of the mold, cam means positioned at one side of the support, and movable between the flanges of the upper and lower mold halves, to initially separate the mold halves, holding means adapted to engage the bead ring of the tire to hold the tire in the lower half of the mold when the mold halves are separated, and ejecting means adapted to engage the under side of the bead ring to strip the tire from the lower half of the mold.

6. A tire mold servicing machine which comprises a support adapted to receive a closed mold, means carried by the support to engage the lower half of the mold and releasably hold the mold in predetermined position, a bridge member pivoted at one side of the support, means to raise and lower the bridge member about its pivot, means carried by the bridge member to releasably engage the upper half of the mold, cam means positioned at one side of the support, and movable between the flanges of the upper and lower mold halves, to initially separate the mold halves, holding means adapted to engage the bead ring of the tire to hold the tire in the lower half of the mold when the mold halves are separated and ejecting means movable into engagement with the underside of the bead ring and operable through the return of said mold separating means to strip the tire from the mold.

7. A tire mold servicing machine which comprises a support adapted to receive a tire mold, a plurality of wedge shaped centering members movable upwardly through the support to engage the lower half of the mold and hold it in predetermined position, a bridge member pivoted at one side of the support, means to raise and lower the bridge member, the bridge member when in lowered position extending diametrically across the top of a mold positioned on the support, adjustable fingers car ried by the bridge member and movable into gripping position beneath the flange of the upper mold half, a wedge cam carried on the end of a shaft mounted at one side of the support, said shaft being horizontally movable to position the wedge cam between the flanges of the mold and means to rotate said shaft and wedge cam to separate the mold halves.

8. A tire mold servicing machine which comprises a support adapted to receive a tire mold, a plurality of wedge shaped centering members movable upwardly through the support to engage the lower half of the mold and hold it in predetermined position, a bridge member pivoted at one side of the support, means to raise and lower the bridge member, the bridge member when in lowered position extending diametrically across the top of a mold positioned on the support, adjustable fingers carried by the bridge member and movable into gripping position beneath the flange of the upper mold half, a wedge cam carried on the end of a shaft mounted at one side of the support, said shaft being horizontally movable to position the wedge cam between the flanges of the mold, means to rotate said shaft and wedge cam to separate the mold halves, and means engaging the upper side of the bead ring of the tire to retain the tire in the lower half of the mold as the mold halves are separated.

9. A tire mold servicing machine which comprises a support adapted to receive a tire mold, a plurality of wedge shaped centering members movable upwardly through the support to engage the lower half of the mold and hold it in predetermined position, a bridge member pivoted at one side of the support, means to raise and lower the bridge member, the bridge member when in lowered position extending diametrically across the top of a mold positioned on the support, adjustable fingers carried by the bridge member and movable into gripping position beneath the flange of the upper mold half, a wedge cam carried on the end of a shaft mounted at one side of the support, said shaft being horizontally movable to position the wedge cam between the flanges of the mold, means to rotate said shaft and wedge cam to separate the mold halves, means engaging the upper side of the bead ring of the tire to retain the tire in the lower half of the mold as the mold halves are separated and a pair of members engaging the lower side of the bead ring at substantially diametrically opposite points to strip the tire from the mold after the upper mold half has been raised by the bridge member.

PAUL W. LEHMAN.